United States Patent [19]
Ohta et al.

[11] Patent Number: 5,313,357
[45] Date of Patent: May 17, 1994

[54] MAGNETIC STORAGE DEVICE AND MANUFACTURING METHOD THEREOF

[75] Inventors: Kenji Ohta; Junichiro Nakayama; Tetsurou Muramatsu, all of Nara, Japan

[73] Assignee: Sharp Kabushiki Kaisha, Osaka, Japan

[21] Appl. No.: 761,251

[22] Filed: Sep. 17, 1991

[30] Foreign Application Priority Data

Sep. 21, 1990 [JP] Japan ................................. 2-253740

[51] Int. Cl.$^5$ .............................................. G11B 5/78
[52] U.S. Cl. .................................................... 360/134
[58] Field of Search ................................. 360/134, 135

[56] References Cited

U.S. PATENT DOCUMENTS

| | | | |
|---|---|---|---|
| 3,655,441 | 4/1972 | Kefalas | 360/134 |
| 4,935,835 | 6/1990 | Godwin et al. | 360/135 |
| 4,939,614 | 7/1990 | Shirakura et al. | 360/135 |
| 4,961,123 | 10/1990 | Williams | 360/135 |
| 5,082,709 | 1/1992 | Suzuki et al. | 428/694 |
| 5,093,173 | 3/1992 | Nakagawa et al. | 360/135 |
| 5,167,096 | 12/1992 | Eltoukly et al. | 51/281 SF |

FOREIGN PATENT DOCUMENTS

2424202 11/1975 Fed. Rep. of Germany .
0883964 11/1981 U.S.S.R. .

OTHER PUBLICATIONS

Bhushan, "Crash Prevention For Magnetic Storage Devices" *Mechanical Engineering* Jan. 1989, pp. 80–84.
*Nikkei New Materials* May 7, 1990, pp. 87 et seq., and English abstract thereof.

*Primary Examiner*—Bruce C. Anderson
*Attorney, Agent, or Firm*—David G. Conlin; George W. Neuner

[57] ABSTRACT

A magnetic storage device and a manufacturing method thereof, the magnetic storage device having grooves formed on a substrate, each of the grooves having a magnetic film formed therein. Since the magnetic head does not contact directly with the magnetic film, reliability of the magnetic disk increases. Moreover, the reproduced output of the magnetic head increases since the space between the magnetic head and the magnetic disk can be reduced. Accordingly, high-density recording becomes possible.

18 Claims, 3 Drawing Sheets

MAGNETIC STORAGE DEVICE AND MANUFACTURING METHOD THEREOF

FIELD OF THE INVENTION

The present invention relates to a magnetic storage device on and from which information is recorded and reproduced, and to a manufacturing method of the magnetic storage device.

BACKGROUND OF THE INVENTION

In recent years, in response to the increase in the sheer volume of information to be dealt with, a demand has arisen for higher density and larger capacity magnetic storage devices which record information. Examples of magnetic storage devices that have appeared in response to this demand are magnetic disks and magneto-optical disks. These are widely used in computers as external storage devices since, apart from the fact that they have a high density and large capacity, they can be randomly accessed.

As shown in FIG. 5, the magnetic disk comprises for example a magnetic film 22 made of a magnetic substance such as CoNiCr and formed on an Al substrate 21, and a lubricant film 23 made of lubricant material such as carbon. The magnetic film 22 and the lubricant film 23 are layered in sequence.

Information is recorded and reproduced by, for example, a magnetic head 27 attached to a flying type slider 26. When the contact-start-stop (CSS) method is used and the magnetic disk is not rotating, the flying type slider 26 presses down on the lubricant film 23 since the flying type slider 26 is suspended from a suspension 25. When the magnetic disk is rotated, a constant space 28 of approximately 0.2 μm comes to be maintained between the magnetic head 27 and the magnetic disk due to the dynamic balancing of a floating force with a depressing force. The floating force is the force exerted upwards on the flying type slider 26 due to an air flow between the lubricant film 23 and the bottom side of the flying type slider 26. The depressing force is the force exerted downwards by the flying type slider 26 since it is suspended from the suspension 27.

When information recorded at high density is to be reproduced, it is desirable that the magnetic head 27 be brought as close as possible to the magnetic film 22 in order to increase the reproduction output of the magnetic head 27. Consequently, the smaller the space 28, the better. However, if the space 28 is too small, the magnetic head 27 sometimes contacts with the lubricant film 23 and, since the lubricant film 23 is thin, problems occur such as noise and damage to the magnetic film 22. Due to the fact that the contact between the magnetic head 27 and the lubricant film 23 occurs at portions projecting from the lubricant film 23, it is desirable that the surface finish of the lubricant film 23 be as fine as possible. This allows the space 28 to be reduced without damaging the magnetic film 22.

However, if the surface finish is too fine the flying type slider 26 may stick to the lubricant film 23, making it impossible for the magnetic disk to start rotating.

In order to prevent such sticking, concavities and convexities are formed on the surface of the lubricant film 23. This is done by a process generally referred to as the texturing process according to which, as shown by a partially enlarged view in FIG. 6, concavities and convexities approximately 20 nm high are formed on the Al substrate 21 by polishing the surface thereof after performing anodic oxide coating. When the magnetic film 22 and the lubricant film 23 are subsequently layered on the Al substrate 21, the lubricant film 23 acquires a concavo-convex surface.

However, a problem exists in the texturing process that a sufficient reproduced output is not achieved because an effective space 28 of more than 0.2 μm becomes necessary in order to prevent the magnetic head 27 from hitting the highest convexities.

SUMMARY OF THE INVENTION

It is an object of the present invention is to provide a magnetic storage device on and from which high-density information can be recorded and reproduced using a magnetic head.

In order to achieve the above object, a magnetic storage device of the present invention is characterized in comprising a plurality of grooves formed on a substrate, a magnetic film being formed in each of the grooves.

With the above arrangement, consider a case where information is recorded on and reproduced from a magnetic disk (which is an example of the magnetic storage device) using, for example, a magnetic head attached to a flying type slider. Here, when the magnetic disk is not rotating, a contact area of the flying type slider with the magnetic disk is reduced since the flying type slider contacts only with the faces of lands located between the grooves. Accordingly, sticking of the flying type slider to the magnetic disk can be avoided.

Further, the reliability of the magnetic disk increases because direct contact no longer occurs between the magnetic film and the flying type slider. A reproduced output of the magnetic head also increases since a space between the magnetic head and the magnetic disk can be reduced. As a result, high-density recording becomes possible.

For a fuller understanding of the nature and advantages of the invention, reference should be made to the ensuing detailed description taken in conjunction with the accompanying drawings.

BRIEF DESCRIPTIONS OF THE DRAWINGS

FIG. 1 is a longitudinal sectional view schematically showing the configuration of a magnetic disk.

FIG. 2 is an explanatory diagram showing a flying type slider having a magnetic head provided thereon and contacting with the magnetic disk.

FIG. 3 shows a manufacturing method of the magnetic disk, (a) to (f) being longitudinal sectional views respectively showing the magnetic disk at each manufacturing stage.

FIG. 5 is an explanatory diagram showing a flying type slider having a magnetic head provided thereon and flying above a magnetic disk.

FIG. 6 is a partially enlarged longitudinal sectional view of the magnetic disk.

DESCRIPTION OF THE EMBODIMENTS

A first embodiment of the present invention is described hereinbelow, referring to FIGS. 1 to 3.

Figure 1:
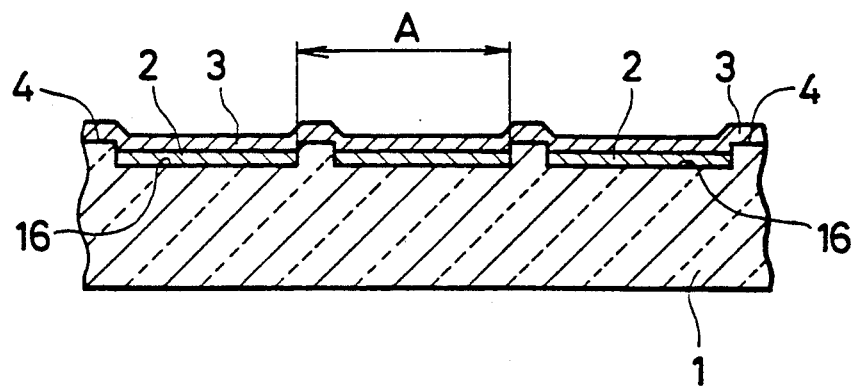
FIGS. 1 to 3 show a first embodiment of the present invention.

As shown in FIG. 1, a magnetic disk as a magnetic storage device of the present embodiment has a disc-shaped glass substrate 1. Soda aluminosilicate, for example, may be used in the glass substrate 1. The glass substrate 1 may, for example, have a diameter of 50 mm and a thickness of 0.8 mm.

A plurality of grooves 16, either spiral or concentric in shape, are provided on one of the faces of the glass substrate 1. A pitch A of the grooves 16 may for example be 1–2 $\mu$m. Lands 4 that form between the grooves 16 are polished until they have a surface finish of approximately 1 nm. A ratio of the width of each of the lands 4 to the width of each of the grooves 16 is approximately 1:5.

The magnetic film 2 is formed in each of the grooves 16. The surface of the magnetic film 2 is set to be lower than the face of each of the lands 4. For example, a plurality of Pt layers or Pd layers may be alternately layered with a plurality of Co layers to form a multi-layered film of Pt/Co or Pd/Co which serves as the magnetic film 2.

A lubricant layer 3 is formed on the magnetic film 2 and on the lands 4. Lubricant material such as carbon may be used as the lubricant film 3.

Figure 2:
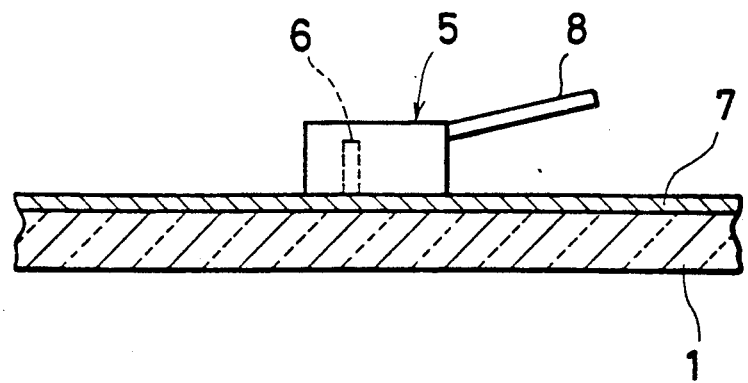
Figure 3A:
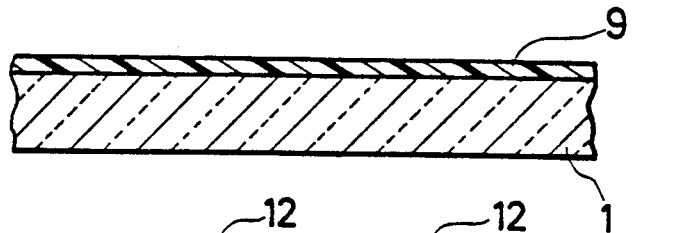
Figure 3B:
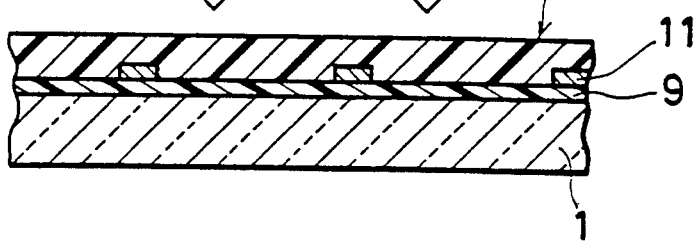
Figure 3C:
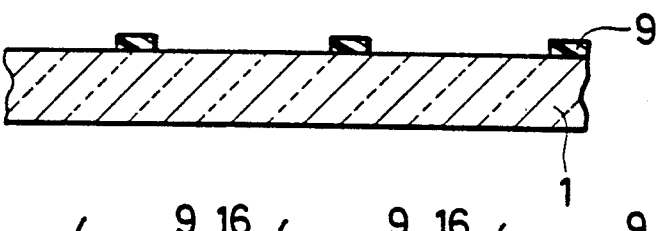
Figure 3D:
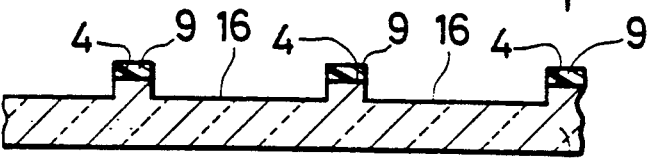
Figure 3E:
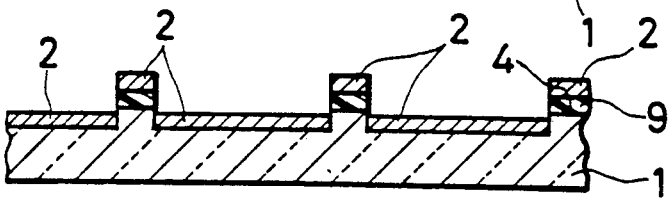
Figure 3F:
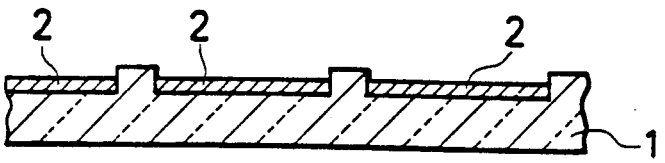

As shown in FIG. 2, information is recorded on and reproduced from the magnetic disk by a magnetic head 6 attached to a flying type slider 5. For the sake of convenience, the grooves 16, the magnetic film 2 and the lubricant film 3 shown in FIG. 1 are shown as a recording layer 7 in FIG. 2.

When the magnetic disk is not rotating, the flying type slider 5 presses down on the recording layer 7 since the flying type slider 5 is suspended from a suspension 8.

When information is to be recorded or reproduced and the magnetic disk is rotated, the flying type slider 5 rises up to a position where a floating force dynamically balances with a depressing force. The floating force is the force exerted upwards on the flying type slider 5 due to an air flow between the recording layer 7 and the bottom side of the flying type slider 5. The depressing force is the force exerted downwards by the flying type slider 5 due to it being suspended from the suspension 8. Information can accordingly be recorded or reproduced without allowing the magnetic head 6 to contact with the recording layer 7.

Even if the lubricant film 3 (see FIG. 1) is damaged due to the flying type slider 5 contacting with the magnetic disk, in the magnetic disk of the present embodiment, since the magnetic film 2 is formed in each of the grooves 16, the magnetic film 2 is not damaged as long as the lands 4 are intact. Thus the magnetic disk of the present embodiment has an exceedingly safe configuration and is therefore very reliable.

Furthermore, since the flying type slider 5 does not contact with the lubricant film 3 provided over the magnetic film 2 in each of the grooves 16, the contact area of the magnetic disk and the flying type slider 5 is reduced. Since the flying type slider 5 is therefore less likely to stick to the magnetic disk, the magnetic disk can start rotating without impediment.

Unevenness of the lubricant film 3 over the lands 4 is slight since the lands 4 are polished until they have a surface finish of approximately 1 nm. Consequently, a space between the magnetic head 6 and the magnetic disk can be reduced sufficiently. This in turn allows the magnetic head 6 to come closer to the magnetic film 2, thus increasing the reproduced output of the magnetic head 6. Specifically, the depth of the grooves 16 may be set to be approximately 80 nm, film thickness of the magnetic film 2 to be 60–70 nm, and film thickness of the lubricant film 3 to be 2–10 nm. Using, for example, a flying type slider 5 of dimensions 2 mm×3 mm and made of ceramic, such as $CaTiO_3$, the space can be set to be less than 0.1 $\mu$m by adjusting the depressing force exerted downwards due to the suspension 8.

Furthermore, since the magnetic film 2 in each of the grooves 16 is separated from the magnetic film 2 in the adjacent grooves 16 by means of the lands 4, a recording area of the magnetic film 2 in any one of the grooves 16 does not spread to the magnetic film 2 in the adjacent grooves 16. Accordingly, when the density of recording tracks is increased, i.e., when pitch A is reduced, crosstalk from neighboring tracks does not occur so easily.

As mentioned earlier, in the magnetic disk of the present embodiment, the magnetic film 2 is not damaged even if the flying type slider 5 contacts with the magnetic disk, as long as the lands 4 are intact. Due to this fact, it also becomes possible in the present embodiment to carry out recording and reproduction of information with the magnetic head 6 contacting with the magnetic disk.

This recording and reproducing method is particularly effective in the case of magnetic disks having a small diameter. If a magnetic disk of radius 10–30 mm is rotated at a high speed of over 3600 rpm, linear velocity remains low (for example, when a magnetic disk of radius 30 mm is rotated at 3600 rpm, the linear velocity is only 11 m/s, approximately). Consequently, even if the slider 5 contacts with the magnetic disk, abrasion does not occur due to friction between the two.

Using this reproducing method, the reproduced output of the magnetic head 6 increases since the magnetic head 6 comes closer to the magnetic film 2 than in the case where the flying type slider 5 floats above the magnetic disk. Accordingly, high-density recording and reproduction become possible.

Ultra-high density recording can be carried out by focusing a laser light on a microscopic area on the magnetic film 2 through the glass substrate 1, thus raising the temperature and thereby reducing the coercive force at the area, information then being magnetically recorded thereon. We shall refer to this method as light-assisted magnetic recording. When the recording and reproducing method described earlier is applied in this case, the reproduction of the information recorded at ultra-high density can be carried out satisfactorily since the reproduced output of the magnetic head 6 is large. In other words, using the magnetic disk of the present embodiment, a new type of magnetic disk device can be realized which can carry out high-density recording as well as reproduction of information recorded at high density.

A manufacturing method of the magnetic disk 3 is described hereinbelow, referring to FIG. 3.

In a first processing step shown by (a) in FIG. 3, a disc-shaped glass substrate 1 of, for example, diameter 50 mm made from, for example, soda aluminosilicate is polished until surface finish is approximately 1 nm. Then, the glass substrate 1 is washed and a positive photoresist 9 is coated on the polished surface to a thickness of approximately 150 nm.

In a second processing step shown by (b) in FIG. 3, a photomask 10 is adhered to the photoresist 9 and the photomask 10 is irradiated with ultraviolet rays 12 of wavelength 200–400 nm. Light interrupting plates 11 made from Ta or the like are buried into the photomask 10 so that positions on the photoresist 9 corresponding to the lands 4 are not irradiated with the ultraviolet rays 12.

In a third processing step shown by (c) in FIG. 3, the photoresist 9 is developed.

In a fourth processing step shown by (d) in FIG. 3, spiral or concentric grooves 16 are formed by carrying out reactive ion etching using a gas such as $CF_4$. The depth of the grooves 16 is set to be approximately 80 nm.

In a fifth processing step shown by (e) in FIG. 3, the magnetic film 2 is uniformly deposited. Here, film thickness of the magnetic film 2 is set at 60–70 nm so that the surface of the magnetic film 2 is lower than the face of each of the lands 4. A multi-layered film is used as the magnetic film 2, the multi-layered film being formed by depositing a plurality of Pt layers or Pd layers alternately with a plurality of Co layers.

In a sixth processing step shown by (f) in FIG. 3, the photoresist 9 remaining on the lands 4 is removed. Accordingly, the magnetic film 2 deposited on the remaining photoresist 9 is also removed.

In a seventh and final processing step, the lubricant film 3, consisting of a carbon film or the like, is deposited by a method such as sputtering or evaporation. Film thickness of the lubricant film 3 is set to be 2–10 nm. The magnetic disk show in FIG. 1 is now ready.

Since in the above manufacturing method the lubricant film 3 deposited on the lands 4 directly contacts with the glass substrate 1, the lubricant film 3 adheres well to the glass substrate 1.

A second embodiment of the present invention is described hereinbelow, referring to FIG. 4.

For the sake of convenience, members having the same function as in the aforementioned embodiment will be designated by the same code and their description will be omitted.

Figure 4:
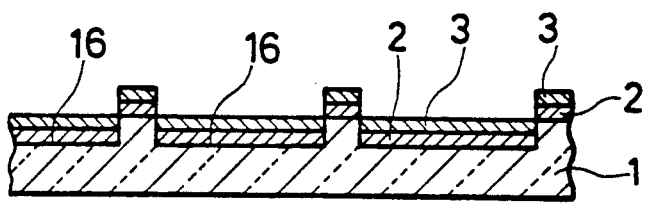
FIG. 4 shows a second embodiment of the present invention and is a longitudinal sectional view schematically showing the configuration of a magnetic disk.
Figure 5:
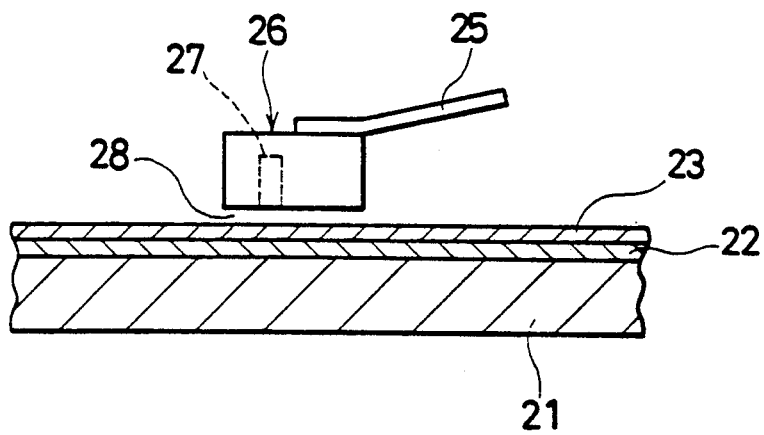
FIGS. 5 and 6 show conventional examples.
Figure 6:
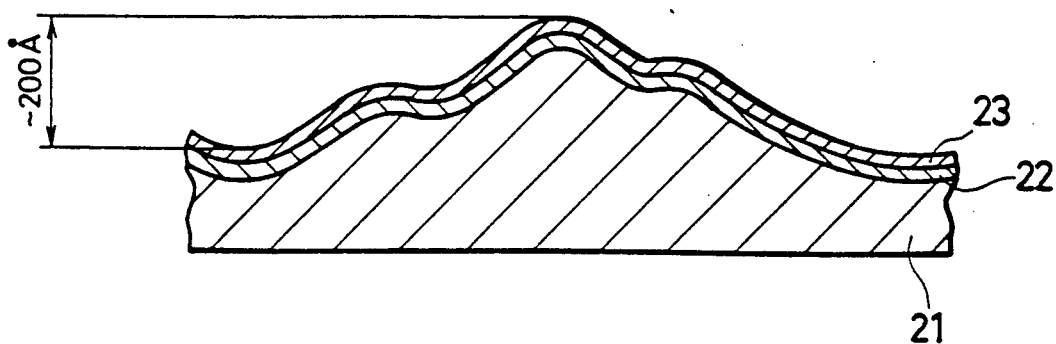

As shown in FIG. 4, a magnetic disk as a magnetic storage device of the present embodiment differs from the magnetic disk of the first embodiment in that a magnetic film 2 is deposited not only in each groove 16 but also on each land 4; and in that the surface of the magnetic film 2 deposited in each of the grooves 16 need not necessarily be lower than the face of each of the lands 4.

In the arrangement described above, since the magnetic film 2 is also deposited on the face of each of the lands 4, the processing steps are reduced, as described further on. Further, even if the surface of the magnetic film 2 in each of the grooves 16 is higher than the face of each of the lands 4, the configuration remains substantially the same as in the previous embodiment since the surface of the magnetic film 2 in each of the grooves 16 remains lower than the surface of the magnetic film 2 on each of the lands 4. In other words, if the surface of the magnetic film 2 deposited on each of the lands 4 is regarded as the effective face of each of the lands 4, then the effective depth of each of the grooves 16 would be the sum of the film thickness of the magnetic film 2 deposited on each of the lands 4 and the height of each of the lands 4. The surface of the magnetic film 2 in each of the grooves 16 is thereby set to be lower than the effective face of each of the lands 4. Consequently, the magnetic film 2 in each of the grooves 16 is not easily damaged. The above arrangement is particularly effective when the glass substrate 1 and the magnetic film 2 adhere well to each other and when the magnetic film 2 and the lubricant film 3 also adhere well to each other.

A manufacturing method of the magnetic disk is described hereinbelow, referring to the manufacturing method of the previous embodiment for comparison.

The processing steps up to the point where the grooves 16 are etched on the glass substrate 1 are the same as the first to fourth processing steps of the previous embodiment. In the present embodiment, after the grooves 16 have been etched, a processing step is carried out whereby photoresist 9 (see (d) in FIG. 3) remaining on the lands 4 is removed. After that, a processing step is carried out whereby the magnetic film 2 is deposited, and then a final processing step is carried out whereby the lubricant film 3 is deposited. These processing steps respectively correspond to the fifth and seventh processing steps.

In other words, in the manufacturing method of the present embodiment, the sixth processing step of the previous embodiment has been omitted and in its place has been introduced a processing step whereby the photoresist 9 remaining on the lands 4 is removed. A dry process, such as ashing which is carried out using oxygen plasma, may be utilized here.

In the previous embodiment, since the sixth processing step, whereby the photoresist 9 and the magnetic film 2 remaining on the lands 4 are removed, needs must be a wet process, it was necessary during the sixth processing step to return to ordinary pressure and to once again create a vacuum for the seventh processing step. In the present embodiment, however, all the processing steps subsequent to and including the process according to which the grooves 16 are etched (this corresponds to the fourth processing step of the previous embodiment) are dry processes. Thus, the manufacturing process is greatly simplified.

In the above embodiments, a multi-layered Pt/Co or Pd/Co film has been described as a specific example of the magnetic film 2. However, a single-layered film or a multi-layered film made from magnetic material such as CoP, Co, Fe, CoCr, TbFeCo, DyFeCo, TbCo, NdFe may equally be used.

Particularly, if a rare earth-transition metal film such as one made of $Tb_{28}Co_{72}$ is used as the magnetic film 2 when the light-assisted magnetic recording described earlier is carried out, the recording can be carried out easily since coercive force can be brought down to below 500 Oe by raising the temperature to 150°–200° C.

A suitable range of a pitch A of the grooves 16 is 1 μm to 10 μm and a suitable ratio of the width of each of the lands 4 to the width of each of the grooves 16 lies in the range 1:10 to 1:5.

A metal substrate such as aluminum substrate may equally be used instead of the glass substrate 1 and a nickel alloy film or the like may be provided on the aluminum substrate. The only requirement is that the substrate have grooves.

Especially in the case of magnetic storage devices such as magnetic cards in which input and output of data take place relatively slowly compared to the magnetic disk, it is desirable to bring the magnetic head and the magnetic storage device into contact since the relative speed of the magnetic head and the magnetic storage device is slow. A plastic substrate can be used in such a magnetic storage device. In such a magnetic storage device, moreover, a hard-coat film made from an ultraviolet-ray hardening resin belonging to the urethane acrylate family may be used instead of the lubricant film.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic storage device on and from which recording and reproduction of information are carried out using a magnetic head, said magnetic storage device comprising:
   a substrate having grooves formed in a surface thereof; and
   a magnetic film formed in each of the grooves,
   film thickness of the magnetic film being set to be less than a depth of each of the grooves,
   the information being recorded on the magnetic film.

2. The magnetic storage device as set forth in claim 1, wherein
   the substrate is made of glass.

3. The magnetic storage device as set forth in claim 2, wherein
   surface finish of lands located between the grooves is substantially 1-2 nm.

4. The magnetic storage device as set forth in claim 3, wherein
   a lubricant film is formed on the magnetic film and on the lands located between the grooves.

5. The magnetic storage device as set forth in claim 4, wherein
   the lubricant film is a carbon film.

6. The magnetic storage device as set forth in claim 5, wherein
   the substrate is disc-shaped.

7. The magnetic storage device as set forth in claim 1, wherein
   the substrate is made of metal.

8. The magnetic storage device as set forth in claim 1, wherein
   the substrate is made of plastic.

9. The magnetic storage device as set forth in claim 1 wherein said grooves are formed in a spiral shape or in the shape of concentric circles.

10. The magnetic storage device as set forth in claim 9 wherein the substrate is made of glass.

11. The magnetic storage device as set forth in claim 9 wherein the surface finish of lands located between the grooves is substantially 1-2 nm.

12. The magnetic storage device as set forth in claim 9 wherein a lubricant film is formed on the magnetic film and on the lands located between the grooves.

13. The magnetic storage device as set forth in claim 9 wherein the lubricant film is a carbon film.

14. The magnetic storage device as set forth in claim 9 wherein the substrate is disc-shaped.

15. The magnetic storage device as set forth in claim 9 wherein the substrate is made of metal.

16. The magnetic storage device as set forth in claim 9 wherein the substrate is made of plastic.

17. The magnetic storage device as set forth in claim 1 where lands are formed on said substrate between the grooves, the ratio of the widths of said lands to the width of said grooves lies in a range from about 0.1 to 0.2.

18. A magnetic storage device on and from which recording and reproduction of information are carried out using a magnetic head, said magnetic storage device consisting essentially of:
    a substrate having grooves formed in a surface thereof; and
    a magnetic film formed in each of the grooves and on the lands located between the grooves,
    the information being recorded on the magnetic film formed in each of the grooves.

* * * * *